Feb. 10, 1953          H. L. MISCH          2,627,946
BRAKE FOR TRANSMISSIONS
Filed March 18, 1948
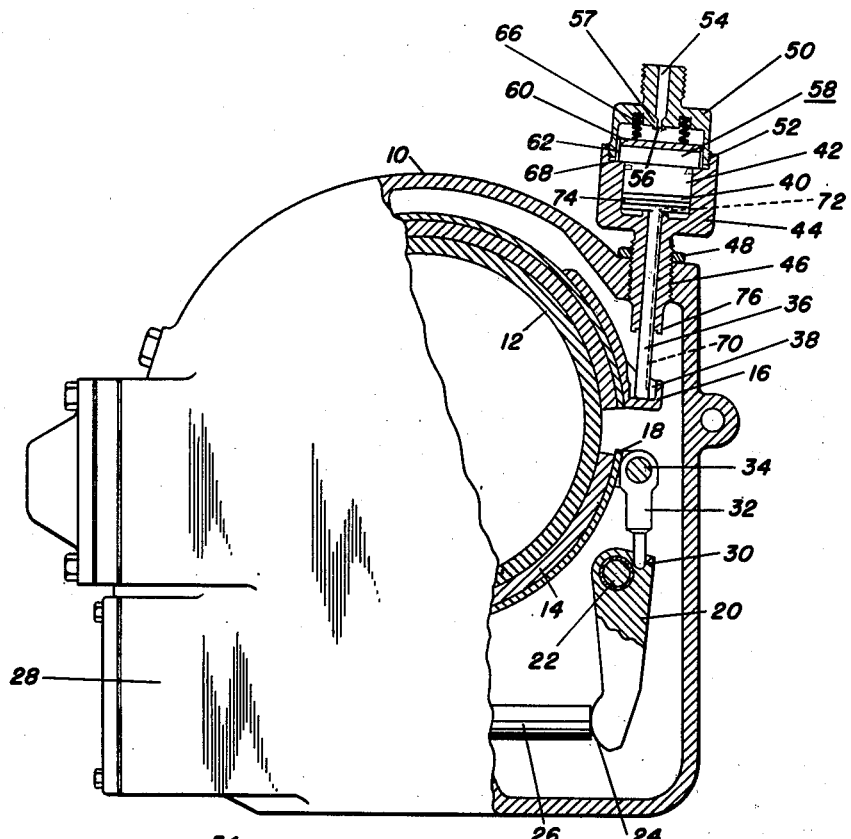
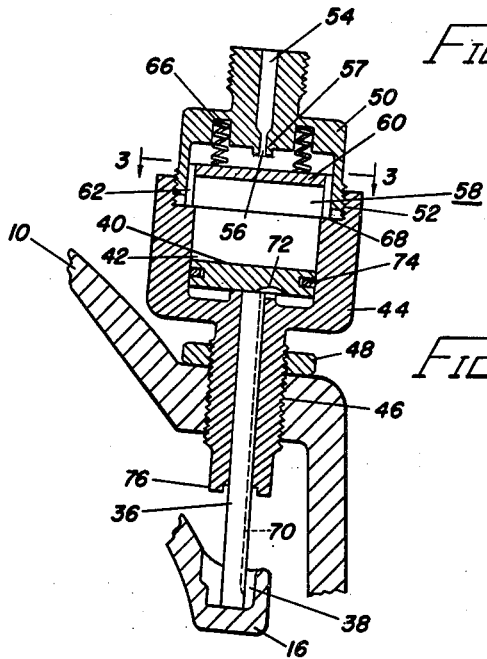
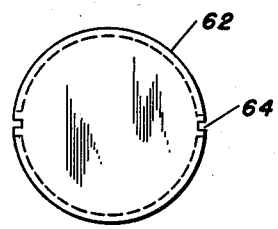
INVENTOR.
HERBERT L. MISCH
BY
ATTORNEY Patented Feb. 10, 1953

2,627,946

UNITED STATES PATENT OFFICE 2,627,946

BRAKE FOR TRANSMISSIONS

Herbert L. Misch, Toledo, Ohio, assignor to Packard Motor Car Company, Detroit, Mich., a corporation of Michigan Application March 18, 1948, Serial No. 15,659

6 Claims. (Cl. 188—77)

1

This invention relates to transmissions, and more particularly to means for automatically modulating the rate of engagement of a planetary gear transmission brake in accordance with the torque exerted on the brake.

In the operation of transmissions having planetary gearing of the internal gear or of the all spur gear types initial movement of the vehicle is effected by restraining the rotation of one element of the gearing to transmit torque from a driving member through the other elements of the gearing to a driven member. For slow starts or part-throttle operation it is desirable that the mechanism for restraining the rotation of the controlled element of the gearing be applied gradually to effect smooth acceleration of the vehicle. For fast starts or full throttle operation it is desirable that the controlled element be restrained from rotating as rapidly as possible to transmit rapidly accelerating torque to drive the vehicle.

An object of this invention is to provide a device for modulating the rate of engagement of a brake member for restraining the rotation of a controlled element of planetary gearing.

A further object of the invention resides in the provision of a device for controlling the rate of engagement of a planetary gear brake by interposing low modulation to effect rapid engagement of the brake when high torque is exerted thereon, and by interposing high modulation to effect slow engagement of the brake when low torque is exerted thereon.

Another object of the invention is to provide a brake modulating device interposed between the anchor end of a brake member and a stationary anchor to permit releasing movement of the anchor end of the brake member inversely proportional to the torque exerted on the brake.

Yet a further object of the invention is to provide a modulating device for the anchor end of a hydraulically actuated brake of a planetary gear train to resist retrograde movement of the anchor end of the brake with a force proportional to torque applied to the brake to induce a pressure drop in the brake actuating mechanism to effect a softening of brake engagement inversely proportional to torque applied to the planetary gearing.

Still another object of the invention is to provide a modulating dash pot between the anchor end of a brake band and a stationary anchor member to regulate the travel of the anchor end of the band in accordance with the braking torque exerted on the band.

2

Yet a further object of the invention is to cushion the engagement of a planetary gear train in proportion to power applied thereto to effect more rapid engagement of the gearing as greater torque is applied thereto.

Other objects of this invention will appear in the following description and appended claims, reference being had to the accompanying drawings forming a part of this specification wherein like refrence characters designate corresponding parts in the several views.

Fig. 1 is a sectional view, partly in elevation, of a transmission embodying the present invention.

Fig. 2 is an enlarged fragmentary sectional view of a portion of the device illustrated in Fig. 1.

Fig. 3 is a sectional view taken substantially on the line 3—3 of Fig. 2 looking in the direction of the arrows.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

My invention is illustrated as applied to planetary gearing of the type embodied in the copending application of Forest R. McFarland Serial No. 690,517 filed August 14, 1946, now Patent No. 2,575,522. It will be apparent that it can be employed with planetary gearing of the internal gear or the all spur gear types.

Referring now to Fig. 1 it will be noted that a casing 10 is adapted to receive a planetary gear unit of any desired type having a releasable member 12. The releasable member 12 may be a drum carried by one of the elements of the planetary unit to act as a fulcrum when locked against rotation to transmit power through the unit at a different speed ratio. A brake band 14 having an anchor end 16 and an actuating end 18 encircles the drum 12 to lock it against rotation.

The brake band 14 may be actuated in any desired manner such for example as by a lever 20 pivoted on a member 22 carried by a fixed member such as the casing 10. The lever 20 has a cammed surface 24 adapted to be engaged and actuated by a rod 26 carried by a piston slidably mounted in a cylinder formed in a portion 28 of the casing 10. The lever 20 is provided with a contoured portion 30 to receive the end of a link 32 pivoted to the actuating end 18 of the band 14 by a pin 34. A high mechanical advantage linkage is thus provided for actuating the band 14. It will of course be apparent that if desired the band 14 may be actuated mechanically rather than hydraulically.

Means are provided for modulating the rate of engagement of the band 14 inversely proportional to the torque exerted by the drum 12 on the band 14 to effect rapid engagement of the brake when high torque is exerted, and to effect slow engagement of the brake when low torque is exerted thereon. One illustrative example of such means includes a fluid pressure responsive device interposed between the anchor end 16 of the band 14 and a stationary member such as the case 10.

An elongated anchor pin 36 seating in a depressed portion 38 of the anchor end 16 of the band 14 is provided with a piston 40 slidably mounted in a cylinder 42 formed in a housing 44 threaded into the case 10 as illustrated at 46 and locked in place therein by a lock nut 48. The housing 44 is provided with a cap 50 threaded thereinto as illustrated at 52 and having a fluid inlet port 54 terminating in a metering orifice 56 defined by projecting walls 57. A valve 58 in the form of a disk 60 having downwardly extending tabs 62 and metering slots 64 is slidably mounted in the cap 50. Yielding means such as springs 66 interposed between the top of the cap 50 and the valve 58 is provided to yieldingly urge the valve 58 downwardly away from the metering orifice defining walls 56 to engage the tabs 62 with a wall 68 of the housing 44.

The elongated anchor pin 36 is provided with a longitudinally extending slot 70 communicating with an arcuate shaped groove 72 in the bottom of the piston 40 to permit any fluid escaping past the sealing ring 72 of the piston 40 in the cylinder 42 to drain out.

When the device is embodied in a motor vehicle, it is desirable, in order to insure smooth acceleration that the rate of engagement of the band 14 with the drum 12, or the rate of deceleration of the drum 12 be substantially inversely proportional to the torque exerted on the band 14 by the drum 12 as it decelerates. For slow vehicle starts it is therefore desirable that the band 14 engage the drum 12 relatively slowly, but for rapid vehicle starts or full throttle operation the band should engage the drum rapidly.

The operation is as follows. Fluid under pressure is supplied from any suitable source through the inlet port 54 and metering orifice 56 to the cylinder 42 above the valve 58. Fluid flows through the metering slots 64 in the valve 58 and urges the piston 40 to the bottom of the cylinder 42 thereby moving the elongated anchor pin 36 outwardly to the full extent of its stroke.

When the band 14 is actuated to engage the drum 12 to restrain its rotation the drum exerts a torque load on the band tending to carry the band around with it, and this torque load is increased as the band is tightened into engagement with the drum. The degree of tightening of the band on the drum is of course dependent in part on the force exerted through the applying linkage to set the brake.

When the brake band 14 is urged into engagement with the drum 12 relatively lightly as in the case of a slow vehicle start a relatively low reaction force is exerted on the anchor end 16 of the band due to the torque exerted on the band by the drum 12. This reaction force is transmitted through the elongated anchor pin 36 and the piston 40 to subject the fluid in the cylinder 42 to pressure. When this pressure overcomes the pressure exerted in the fluid inlet port 54, the fluid from the cylinder 42 flows through the metering slots 64 in the valve 58 and flows through the metering orifice 56 thereby permitting the piston 40 to move upwardly in the cylinder 42 thereby progressively retracting the anchor end 16 of the band 14 until the anchor end 16 of the band engages the abutment 76. As the anchor end of the band retracts the brake applying mechanism continues to exert force in the brake applying direction whereupon a softer engagement is effected to insure smooth vehicle acceleration.

When the brake applying pressure is released the fluid under pressure flows through the inlet port 54, through the metering slots 64 and forces the piston 40 and the anchor end 16 of the band 14 back to the inoperated position illustrated in Fig. 1.

If the brake applying mechanism is actuated rapidly as in the case of full throttle vehicle acceleration the band 14 is urged into firm engagement with the drum 12. High torque load is then transmitted from the drum to the anchor end 16 of the band to shift the anchor pin 36 and move the piston 40 to develop high fluid pressure in the cylinder 42 beneath the valve 58. The high fluid pressure thus developed shifts the valve 58 upwardly against the resistance of the springs 66 to close the metering orifice 56 and prevent the escape of fluid from the cylinder 42. The anchor end 16 of the band 14 thus moves only slightly in the retrograde direction whereupon the drum is locked against rotation rapidly to transfer accelerating torque through the planetary unit as illustrated in Fig. 2.

When the applying pressure is released the springs 66 force the valve 58 downwardly uncovering the orifice 56 and permitting fluid to enter the cylinder 42 as described above to return the parts to their inoperative position.

The operation can of course be calibrated by varying the size of the metering orifice 56, the size of the metering slots 64, the strength of the springs 66, the diameter of the piston and cylinders 40 and 42, and the viscosity of the oil to effect desired operating characteristics.

It will be apparent that other forms of the invention may be employed without departing from the spirit of my invention.

I claim:

1. In a planetary gear train, a releasable member, a brake band having actuating and anchor ends to lock the releasable member against rotation to transmit torque through the gear train, means operably connected to the actuating end of the brake band to clamp the brake band to the releasable member, a stationary member, the combination therewith of a brake modulating device comprising a cylinder carried by the stationary member, a piston slidably mounted in the cylinder, connecting means between the piston and the anchor end of the brake band, the cylinder having a fluid inlet port on the side of the piston opposite the connecting means, a source of fluid under pressure in fluid communication with said port, a valve controlling the inlet port, and yielding means urging the valve toward the open position, whereby the anchor end of the brake band is moved in the brake releasing direction in opposition to fluid pressure exerted in the cylinder.

2. In a planetary gear train for a motor vehicle, a rotatable member, a brake band including actuating and anchor ends to lock the rotatable member against rotation to transmit torque, means operably connected with the actuating end of the brake band to engage the brake band with the rotatable member, a stationary member, the combination therewith of a brake modulating device comprising a cylinder carried by the stationary member, a piston slidably mounted in the cylinder, connecting means between the piston and the anchor end of the brake band, a source of fluid under pressure the cylinder having means defining an inlet port to admit said fluid under pressure to the cylinder, a valve interposed between the piston and the means defining an inlet port to the cylinder, said valve being responsive to the fluid pressure between the valve and port to close the port, and yielding means urging the valve toward the open position to permit releasing movement of the anchor end of the brake band inversely proportional to the torque exerted between the brake band and the rotatable member and whereby upon a sudden application of the brake band to the rotatable member the valve closes the inlet port to substantially prevent releasing movement of the anchor end of the brake band.

3. A device for modulating the rate of engagement of a planetary gear train having a releasable member comprising a brake band including an anchor end to restrain the releasable member to transmit torque through the gear train, a stationary member, a fluid pressure device having a cylinder carried by the stationary member, a source of fluid under pressure means including a fluid metering member to admit said fluid under pressure to the cylinder, a metering valve associated with the fluid metering member, yielding means urging the metering valve toward the open position with reference to the fluid metering member, a piston in the cylinder, said metering valve being interposed in the cylinder between the piston and metering member and being movable toward its closed position by fluid pressure in the space between the valve and piston and connecting means between the piston and the anchor end of the brake band to subject fluid in said cylinder to torque reaction exerted on the anchor end of the brake band.

4. A device for modulating the rate of engagement of a planetary gear train having a releasable member comprising a brake band including actuating and anchor ends to restrain the releasable member to transmit torque through the gear train, means operably connected to the actuating end of the brake band to engage the band with the releasable member, a stationary member, a fluid pressure device having a cylinder carried by the stationary member, a piston in the cylinder, an elongated anchor pin between the piston and the anchor end of the brake band, means in the cylinder on the side of the piston opposite the anchor pin defining a fluid metering member to admit fluid under pressure to the cylinder, a metering valve between the piston and the fluid metering member and biased to closed position by fluid pressure in the space between the valve and piston, and yielding means urging the metering valve toward the open position with reference to the fluid metering member to induce movement of the anchor end of the brake band in the brake releasing direction inversely proportional to torque exerted on the brake band when said band is subjected to low torque and to shift the valve to interrupt fluid flow through the metering member when the band is subjected to high torque.

5. A device for modulating the rate of engagement of a brake band with a releasable member controlling a torque transmitting device comprising a stationary member, means operably connected to an actuating end of the brake band to engage the brake band with the releasable member, a cylinder carried by the stationary member and having means defining an inlet for fluid under pressure, a piston slidably mounted in the cylinder and operably connected on the side opposite the fluid inlet to an anchor end of the brake band to exert fluid pressure thereon to resist retrograde movement of the anchor end of the brake band, a metering valve interposed between the piston and the means defining an inlet for fluid under pressure to the cylinder, and yielding means urging the metering valve toward the open position to modulate the rate of engagement of the brake band with the releasable member proportionally to the torque exerted on the band to effect rapid engagement when high torque is exerted and to effect slow engagement when low torque is exerted.

6. A device for modulating the rate of engagement of a brake band adapted to engage a rotatable member comprising a stationary member, means operably connected to an actuating end of the brake band to engage the brake band with the rotatable member, a cylinder carried by the stationary member and defining a pressure chamber, a piston slidably mounted in the cylinder and operably connected to an anchor end of the brake band to resist retrograde movement of said anchor end, means defining a metering orifice to admit fluid to said chamber, a disk interposed between the piston and the means defining the metering orifice and adapted to move between restricting and nonrestricting positions relative to said orifice defining means, and yielding means urging the disk toward the nonrestricting position relative to the orifice defining means to modulate the rate of engagement of the brake band with the rotatable member proportionally to the torque exerted on the band to effect rapid brake engagement when high torque is exerted and to effect less rapid engagement when lower torque is exerted.

HERBERT L. MISCH.

REFERENCES CITED

The following references are of record in the file of this patent:

UNITED STATES PATENTS

| Number | Name | Date |
| --- | --- | --- |
| 772,874 | Donaldson | Oct. 18, 1904 |
| 1,646,718 | Wilkinson et al. | Oct. 25, 1927 |
| 1,711,886 | Ginter | May 7, 1929 |

FOREIGN PATENTS

| Number | Country | Date |
| --- | --- | --- |
| 161,618 | Great Britain | Apr. 21, 1921 |
| 498,588 | Great Britain | Jan. 10, 1939 |